Oct. 4, 1932.  W. C. DUNN  1,880,343
MEANS FOR ADJUSTING VEHICLE SPRINGS
Filed May 31, 1929    2 Sheets-Sheet 1
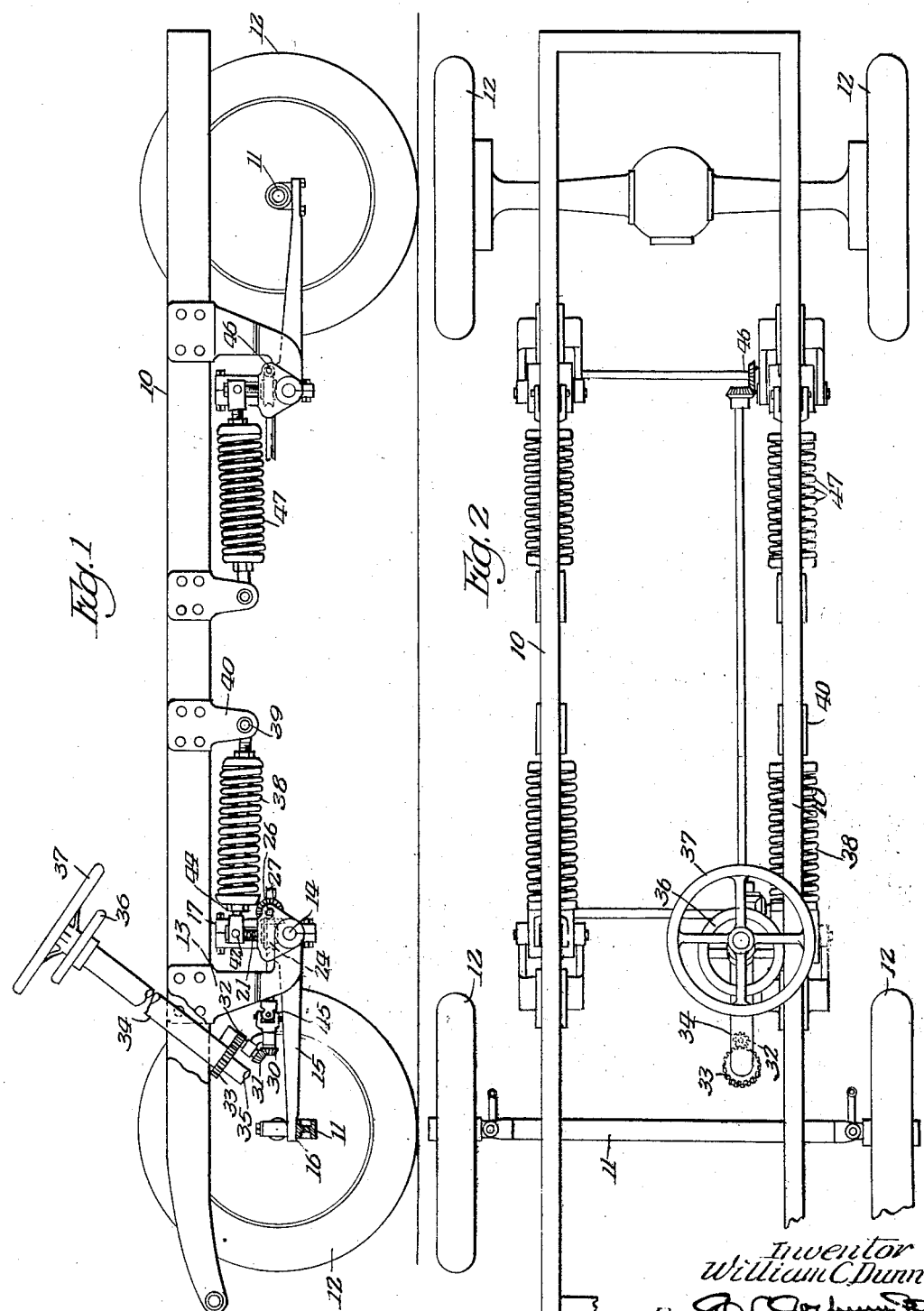

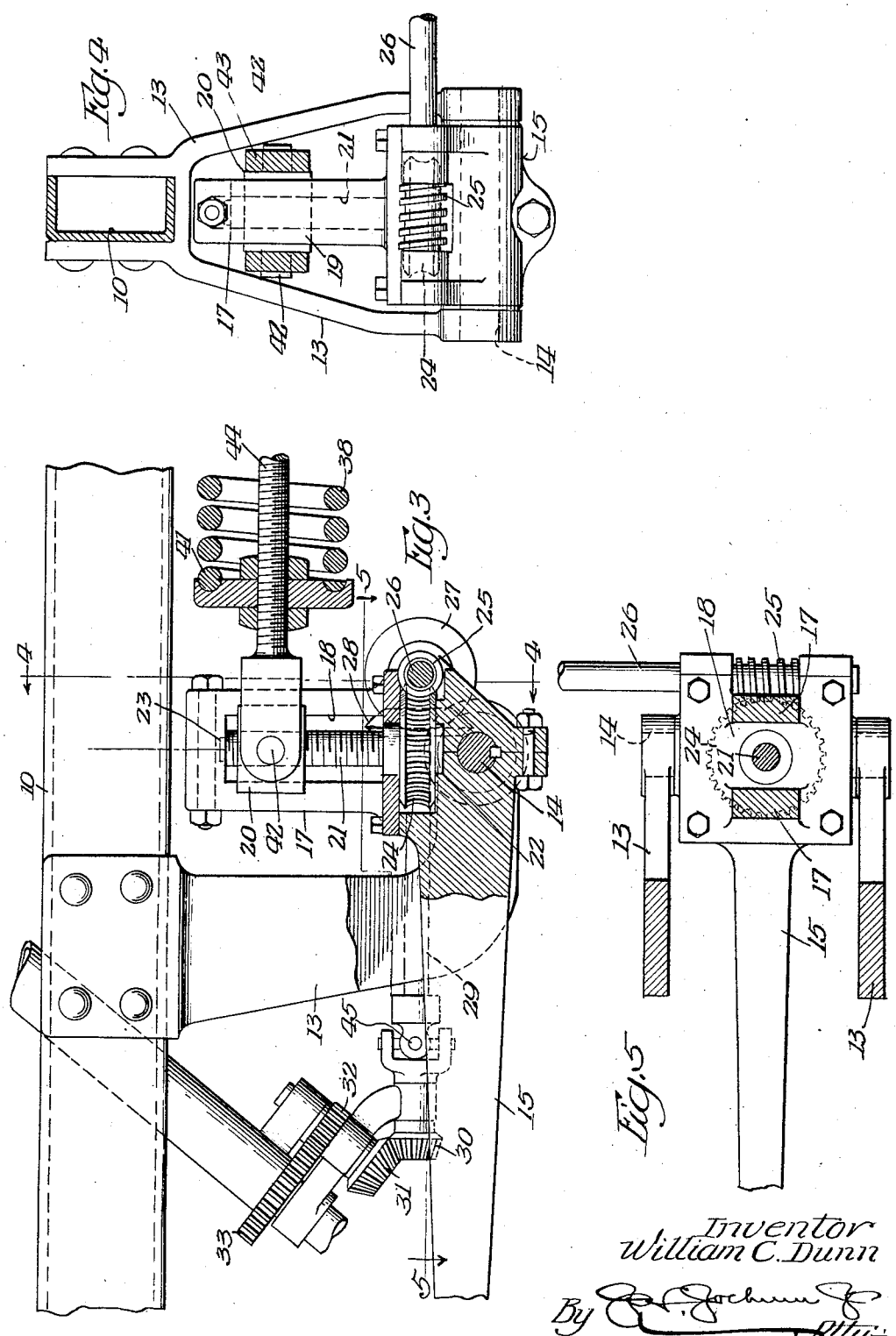

Patented Oct. 4, 1932

1,880,343

UNITED STATES PATENT OFFICE

WILLIAM C. DUNN, OF CHICAGO, ILLINOIS

MEANS FOR ADJUSTING VEHICLE SPRINGS

Application filed May 31, 1929. Serial No. 367,261.

In automobile spring supporting devices commonly used, the leaf spring devices of various kinds are arranged for safe load carrying at the maximum load, and which with lighter loads makes the riding quality poor as the stiffness and rebounds are neither agreeable nor correct.

It is one of the objects of the present invention to overcome these difficulties and objections and to provide manual means whereby an adjustment of the spring stresses, which will be simple, effective and complete, may be obtained, thereby improving the riding qualities of the vehicle and insuring an adjustment to compensate varying load conditions.

A further object is to provide improved means whereby such adjustment may be obtained from a remote point upon the vehicle and which means will be under the control of the operator of the vehicle.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a side elevation of a vehicle chassis and spring suspension therefor, having adjusting means constructed in accordance with the principles of this invention applied thereto.

Figure 2 is a top plan view of Figure 1, with parts omitted.

Figure 3 is a view partly in elevation, partly in section and partly broken away of a portion of the adjusting means on an enlarged scale.

Figure 4 is a sectional view taken on line 4—4, Figure 3.

Figure 5 is a detail sectional view taken on line 5—5, Figure 3.

Referring more particularly to the drawings and to the form of the invention shown in Figures 1 to 5, the numeral 10 designates the chassis of a vehicle, 11 the axles and 12 the supporting wheels.

The spring suspension may be applied either to the front or rear wheels or both, therefore the specific description of one will apply equally as well to both.

Supported by and depending from the chassis 10 is a bracket 13, to which a bell crank lever is pivotally mounted as at 14.

One arm 15 of the lever is connected as at 16 to the axle 11 and the other arm 17 is preferably provided with an opening 18 therethrough in which a nut 19 is adapted to move, the nut being preferably provided with flanges 20 engaging the side faces of the arm 17.

A screw 21 is journaled at its ends as at 22—23 in suitable bearings in the lever and the screw passes through the nut 19 so that when the screw is rotated the nut 19 may be moved lengthwise thereof.

Any suitable means may be provided for rotating the screw. A simple and efficient means embodies a worm gear 24 which is connected with the screw for rotation therewith. Meshing with the worm gear is a worm 25 which is connected with a shaft 26 for rotation therewith and the shaft may extend to the other side of the chassis so that by operation of the shaft adjusting devices on both sides of the chassis may be simultaneously operated.

The shaft 26 may be rotated in any desired or suitable manner preferably by means of a beveled gear 27 secured thereto for rotation and with which beveled gear another beveled gear 28 meshes. The gear 28 is secured to a shaft 29 for rotation therewith and the shaft 29 is preferably rotated through the medium of a gear 30 connected therewith and with which gear 30 another gear 31 meshes. The gear 31 has connected with it another gear 32 for rotation therewith and the gear 32 in turn meshes with a gear 33 which may be secured to a shaft 34 which encompasses the steering shaft 35. Connected with the shaft 34 is a hand wheel 36 which latter is preferably arranged in proximity to the steering wheel 37, so that when the steering wheel 37 is actuated to actuate the steering shaft 35 the adjusting device will not be interfered with. However, when the hand wheel 36 is actuated the worm wheel 24 and screw 21 will be rotated, thereby causing the nut 19 to be moved lengthwise of the screw.

Obviously, any other form of mechanism may be provided for rotating the screw or threaded shaft 21.

The spring suspension device may be of any construction, but preferably consists of a spring device 38 which is pivotally connected at one end as at 39 to a bracket 40 which depends below the chassis of the vehicle. The other end 41 of the spring 38 is pivotally connected as at 42 by means of a bifurcated extremity 43 of a rod or link 44 with the nut 19 through the medium of suitable trunnions, so that when the nut 19 is adjusted with respect to the arm 17 of the bell crank lever the point of pivotal connection of the rod or link 44 with the nut 19 will be raised or lowered with respect to the axis of the pivot 39 of the spring thereby varying the tension or stress of the spring by varying the position of its point of connection with respect to the length of the arm 17 of the bell crank lever.

Thus it will be manifest that whenever it is desired to change the stress of the spring 38 it is only necessary to adjust the hand wheel 36, the result being that through the medium of the intermeshing gear connection with the shaft 26, the nut 19 may be adjusted from the vehicle.

In order to compensate any movement which would be caused by the rocking of the bell crank lever about the pivot 14 any suitable means may be provided, such for instance as a universal connection or joint 45 in the shaft 29.

Obviously the shaft 29 may have a similar connection with the shaft 46 for controlling the spring suspensions 47 at the other end of the vehicle.

With this invention means are provided whereby the stress of the spring suspension device may be varied at will to compensate the varying load conditions and from the vehicle at a remote point from the suspension.

It will be manifest that this adjusting device may be applied to the spring suspensions used in connection with either the front or rear wheels of the vehicle or both.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination a vehicle frame, a spring suspension therefor disposed below the frame, said suspension embodying a pivotally mounted lever, a spring, one end of the spring being pivotally connected with said lever, the other end of the spring being connected with the vehicle frame, means for varying at will the stress of said spring from a point remote therefrom, said means embodying a traveling member mounted upon the lever, and worm gear mechanism for effecting a traveling movement of said member upon the lever.

2. In combination a vehicle frame, spring suspension therefor disposed below said frame, said suspension embodying a lever, a spring connected with the lever and the vehicle, and means for varying the stress of said spring from a point remote therefrom, the said means embodying gear mechanism for varying at will the point of connection of the spring with said lever.

3. In combination a vehicle frame, spring suspension therefor disposed below said frame, said suspension embodying a bell crank lever, a spring connected with one arm of the lever and the vehicle, means for varying the stress of said spring from a point remote therefrom, the said means embodying a member connected with said arm of the lever and shiftable lengthwise thereof, and gear mechanism thus shifting said member for varying at will the point of connection of one end of said spring with respect to the part to which it is anchored.

4. In combination a vehicle, spring suspension therefor, said suspension embodying a lever, a member mounted to slide upon the lever, a spring, one end of the spring being secured to said member, the other end being anchored to the vehicle frame, means for varying the stress of said spring at will by moving said member upon said lever, and means for thus moving the member with respect to the lever from a point remote therefrom and from the vehicle.

5. In combination a vehicle, spring suspension therefor, said suspension embodying a lever, a member mounted to slide upon the lever, a spring, one end of the spring being secured to said member, the other end being anchored to the vehicle frame, means for varying the stress of said spring at will by moving said member upon said lever, and means embodying gear mechanism for thus moving the member with respect to the lever from a point remote therefrom and from the vehicle.

In testimony whereof I have signed my name to this specification, on this 30th day of April, A. D. 1929.

WILLIAM C. DUNN.